United States Patent [19]
Black

[11] 3,968,720
[45] July 13, 1976

[54] FASTENERS

[76] Inventor: Hugh Black, P.O. Box 953, Waynesville, N.C. 28786

[22] Filed: Feb. 3, 1975

[21] Appl. No.: 546,288

[52] U.S. Cl. .................................................. 85/11
[51] Int. Cl.² ........................................ F16B 15/00
[58] Field of Search ................. 85/11, 14; 52/753 K

[56] References Cited
UNITED STATES PATENTS

| | | | |
|---|---|---|---|
| 611,439 | 9/1898 | Plested | 85/11 |
| 1,793,185 | 2/1931 | McChesney | 85/11 |
| 3,618,446 | 11/1971 | Black | 85/11 |

*Primary Examiner*—Ramon S. Britts
*Attorney, Agent, or Firm*—Alter and Weiss

[57] ABSTRACT

Wood fasteners with main body sections having leading edges and trailing edges. The leading edges are sharpened to facilitate the entry of the fastener into the wood being fastened. Splines extend from each of the two sides of the fasteners. Each of the splines has a portion extending downward and another portion extending upward. The oppositely disposed spline portions tightly lock the wood joints fastened together by the fastener.

4 Claims, 7 Drawing Figures

FASTENERS

This invention relates in general to wood fasteners and in particular to characterized wood fasteners that are amenable to being driven directly into light pieces of wood, such as those used in fabricating picture frames, by industrial type staplers, without any pre-slotting of the wood.

Industry is continually searching for new and improved ways of invisibly joining together sections of material, such as wood, which are used in making picture frames and/or decorative moldings. Such fasteners are also ideally suited for miter and butt joints with wood strips having small cross-sections where there is only space for one fastener to lock together a plurality of pieces of wood.

Wood sections of picture frames, for example, can be invisibly joined together using glue. Glue, however, tends to dry out and loses its adhesive characteristics, such that the joined sections part, much to the consternation of the owner of the home.

The life of the article of furniture can, of course, be prolonged by techniques, such as dovetailing separate sections together. The dovetailing, of course, appreciably increases the costs of the decorative moldings or picture frames. In addition, when the dovetailing arrangement is used, skilled artisans and/or high priced tools are required for the fabrication, rather than technicians using common tools.

Alternatively, well-known threaded nails or screws can be used for attaching the sections together. The drawback in the use of such well-known threaded nails or screws is, among other things, that time is required to make the fasteners invisible. Thus, the nails and screws require counter sunk holes with putty to cover the visible top portions of the nails or screws. The results are never top quality. Even a more serious drawback in the use of nails is that nails do not really clamp the separated sections together; while drilled holes are preferred, when using screws.

Wood fasteners, such as shown in some of my previous patents, such as U.S. Pat. No. 3,618,446, have been used to overcome some of the above-enumerated difficulties. However, such fasteners themselves have difficulty in locking together strips of wood of small cross sections, such as used in moldings or picture frames. with such fasteners, as shown in the above patent, it is often necessary to use two fasteners to be certain of having a reliably tightly locked joint. However, oftentimes there is only room for one fastener. Thus, a fastener is sorely required that can singly, without the necessity of pre-slotting, tightly lock together two pieces of wood used in picture frames or decorative moldings, for example.

Accordingly, it is an object of the present invention to provide a wood fastener capable of joining together all types of wood sections, including pressed wood sections having small cross sections, without overstressing the wood sections; and nonetheless, providing a strong and reliable tight bond between the pieces of wood so held together.

A related object of the present invention is to provide wood fasteners capable of joining together abutting wood sections of wood in a miter joint, wherein the wood fasteners are shaped to facilitate their being forceably inserted into the wood through the use of industrial type staplers, and wherein the fasteners when forced into the unslotted wood do not crack the wood.

Yet another object of the present invention is to provide wood fasteners, which when forced into the wood, displace the wood in a manner which locks the fasteners into the wood joints, and locks the wood sections joined together in contiguous relationship.

A preferred embodiment of the present invention features wood fasteners having a main body section with leading and trailing ends. The leading ends preferrably sharpened to facilitate entrance of the fastener into the wood sections being joined together. Each side of the main body section has at least one pair of splines, with one of the splines of the pair extending upward and the other one downward. The splines on the opposite sides of the bodies extend in the same directions.

The main body section has means, such an elongated hole, therein which acts to receive some of the wood displaced by the fastener being inserted into the wood. This precludes the wood displaced by the entry of the fastener from cracking or causing cracks in the wood sections being joined together. The counter-disposed splines facilitate straight entry of the fastener into the wood to lock the fastener in place, as well as hold the sections being joined together in a locked tight, contiguous relationship.

An alternative embodiment features more than two oppositely disposed spline sections at each of the sides of the fastener body.

The above-mentioned and other features and objects of this invention and the manner of obtaining them will become more apparent and the invention itself will be best understood by reference to the following description of an embodiment of the invention taken in conjunction with the accompanying drawings, in which.

Figure 2:
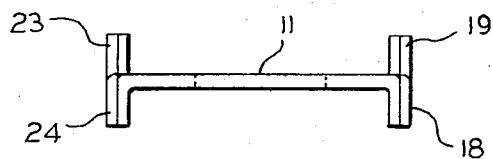
FIG. 2 is a front view of the embodiment shown in FIG. 1.
Figure 1:
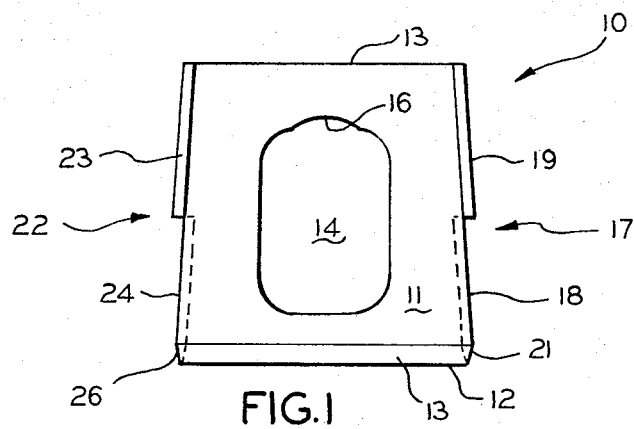
FIG. 1 is a plan view of a first embodiment of the invention.
Figure 3:
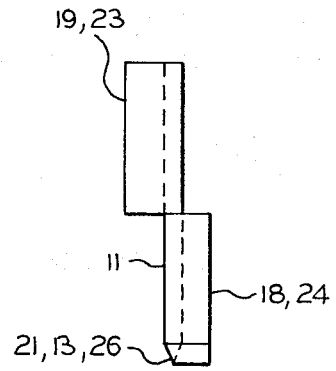
FIG. 3 is a side view of the embodiment shown in FIG. 1.

The fastener of FIG. 1 is generally designated by the number 10. The fastener 10 comprises a flat main body section 11, which may have a slightly wedged shape with the front portion 12 being broader than the trailing or posterior portion 13. The main body section 11 is shown as having an elongated hole 14 generally centrally located. The hole is generally rectangular in shape with curved corners and there is shown an extension or annex section 16 at the trailing edge of the hole 14.

The leading edge 12 of the main body section 11 is shown as having a sharpened section 13 to facilitate driving the fastener 10 into the wood pieces being fastened together.

Each of the sides of the main body section 11 has at least a pair of splines extending upwardly and downwardly therefrom. For example, there is shown on side 17 of main body section 11 a downwardly extending spline 18 and an upwardly extending spline 19. The front edge of spline 18 is also sharpened as shown at 21 to facilitate the entry of the fastener 10 into the wood.

Similarly, on the other side of the main body section 11 of fastener 10, there are shown a pair of oppositely disposed splines at side 22, such as upwardly extending spline 23 and downwardly extending spline 24. Here again, the front end of spline 24 is shown sharpened at 26, to facilitate the entry of the fastener into the objects being fastened together.

The rear view of the fastener 10 shows the extent of the vertical dimensioning of the splines in relation to the overall breadth of the main body section of the fastener.

Figures 4, 5, 6, 7:
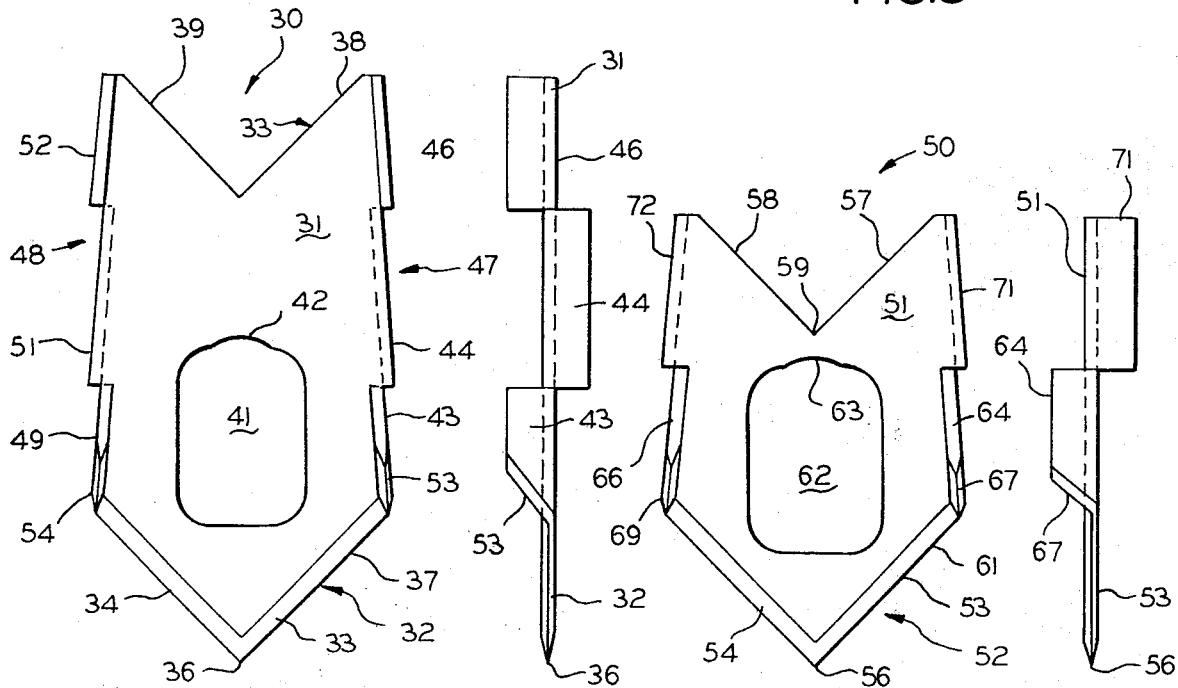
FIG. 4 is a plan view of a second embodiment of the invention.
FIG. 5 is a side view of the second embodiment of the invention.
FIG. 6 is a plan view of a third embodiment of the invention.
FIG. 7 is a side view of the third embodiment of the invention, as shown in FIG. 6.

The embodiments of FIGS. 4 and 5 show a fastener 30 having a main body section 31 with an anterior edge 32 and a posterior edge 33. The anterior edge is pointed and is composed of two sections; namely, one diagonal section 33 meeting a second diagonal section 34 to form a point at 35. The whole leading section is sharpened at its leading edge 37. Similarly, the trailing section or anterior section 33 is a reverse point, that is, the point is punched out forming a section of the main body where displaced wood can settle. The punched out section forms diagonal trailing edges 37 and 38 which meet at the point 39.

A hole 41 having an annex section 42 is centrally located with regard to the width of the fastener, but is forwardly located with regard to the length of the fastener. The fastener shown has at least three splines on each side. For example, there is an upwardly extending spline 43, a downwardly extending spline 44, and an upwardly extending spline 46 at side 47. Opposite side 47, on side 48 is an upwardly extending spline 49, a downwardly extending spline 51 and an upwardly extending spline 52.

The leading edges of the forward splines 43 and 49 are sharpened as shown at 53 and 54, respectively. The pointed front end of the fastener of FIG. 4 aids in forcing the fastener 30 into the narrow cross sectioned wood pieces being joined together. The aperture 41, as well as the pointed end 39, leaves room for the wood being split by the wedged shaped fastener 30 to settle without cracking the pieces of wood being joined together. The sharpened forward ends extending in the same direction facilitate the entry of fastener 30 into the pieces of wood being joined together. The sharpened forward ends that extend in the same direction prevent any twisting of the fastener as it is forced into the wood.

The embodiment shown in FIGS. 4 and 5 is particularly suited for longer fasteners used in joining together three different pieces of wood, for example. The fastener 30 is slightly wedge shaped with the broader side being at the anterior end and the narrower side being at the posterior end.

A third embodiment of the invention shows a fastener 50 having a main body section 51. The main body section 51 has a front end 52 formed from a pair of diagonal front sides 53 and 54, which come together in point 56. The rear sides are also comprised of diagonals 57, 58 coming together at point 59. The front sides 53 and 54 are sharpened, such as shown at 61.

The centrally located aperture 62, shown with an annex 63, is located in the main body section 51. It aids in avoiding strains from the displaced wood cracking the wood being joined together. Here again, the oppositely disposed spline sections aid in locking together the pieces of wood being joined together in a reliable, contiguous relationship with the section having the front splines reaching through the first piece of wood being joined together so that the section of the fastener having rear splines, secures the first section of wood, while the front splines secure the second section of wood.

Each side of the main body section has front splines that are upwardly extending, such as front splines 64 and 66, which are sharpened at 67 and 68, respectively, and the rear splines that are downwardly extending, as shown at 71 and 72, on the opposite sides of the fastener 50.

When being forced into the pieces of wood being held together, the unique multi-splined fasteners pass through the first piece of wood so that the front section and the rear section of the fastener are embedded into the separate pieces of wood being joined together. The separate pieces are locked contiguous to each other, since the set of splines in the front section and the set of splines in the rear section extend in opposite directions causing the resiliency of the fastener material to force the separate pieces into abutment.

As shown, the direction of the splines can be interchanged. For example, in FIG. 1 the front splines are downwardly extending, while in FIG. 7 the rear splines are downwardly extending. In FIG. 4 there are three sets of splines shown in an order of upwardly extending, downwardly extending and upwardly extending. It should be understood that this order can easily be reversed within the scope of this invention.

Further, both the embodiments of FIG. 4 and of FIG. 6 provide additional space for the displaced wood to settle without fracturing or weakening the wood pieces joined together.

While the principles of the invention have been described above in connection with specific apparatus and applications, it is to be understood that this description is made only by way of example, and not as a limitation on the scope of the invention.

I claim:

1. A fastener for securely joining material sections together, said fastener comprising a main body section, said main body section having a leading end and a trailing end and sides connecting said leading end and said trailing end, said leading end being tapered and being wider than said trailing end, said main body section having an aperture therein substantially centrally located, peripheral walls depending from each of said sides of said main body section, each of said peripheral walls having a first extending spline portion, said first extending spline portion of each of said peripheral walls being opposite to each other and both extending in a first direction substantially normal to said main body section and being spaced apart by said main body section, said first extending spline portion of each of said peripheral walls being located the same distance from said leading end, said peripheral walls each having a second extending spline portion, said second extending spline portion of each of said peripheral walls being axially offset from said first extending spline portion without any overlapping and being further from said leading end than said first extending spline portion of each of said peripheral walls, said second extending spline portion of each of said peripheral walls being opposite to each other and being in an axial extending section of the peripheral walls where there is no first extending spline portion, said second extending spline portion of each of said peripheral walls both extending in a second direction substantially normal to said main body section and being spaced apart by said main body section, and said first and second directions being opposite each other.

2. The fastener of claim 1 wherein the leading end of said fastener comprises a first biased section and a second biased section, said first and second biased sections meeting at a point approximately midway between the sides of said fastener forward of said peripheral walls, the edges of said biased section being sharpened to facilitate entrance of said fastener into said material sections, said trailing end comprising a first trailing end biased section and a second trailing end biased section, said first and second trailing end biased sections meeting at a point approximately midway between the sides of said fastener, said trailing end of said fastener having the same thickness as the unsharpened front of said fastener, whereby said fasteners can be driven into said material sections and buried therein without pre-slotting, and wherein said second extending spline portions are of constant height.

3. The fastener of claim 2 wherein all of said spline portions are of approximately the same height.

4. The fastener of claim 3 wherein the leading end of the first extending spline portions are biased and the leading end of the second extending spline portions are normal to said main body section.

* * * * *